(12) United States Patent
Briggs

(10) Patent No.: US 8,742,300 B2
(45) Date of Patent: Jun. 3, 2014

(54) INVERTER SYSTEM

(75) Inventor: Michael D. Briggs, Owens Crossroads, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 637 days.

(21) Appl. No.: 13/007,747

(22) Filed: Jan. 17, 2011

(65) Prior Publication Data

US 2011/0110120 A1    May 12, 2011

Related U.S. Application Data

(63) Continuation of application No. 10/972,234, filed on Oct. 22, 2004, now Pat. No. 7,928,345.

(51) Int. Cl.
*H05B 1/02*    (2006.01)

(52) U.S. Cl.
USPC ........... 219/488; 219/203; 219/505; 219/543; 219/548; 323/369; 363/106; 363/109; 244/134 R; 244/134 D

(58) Field of Classification Search
CPC ............................ H05B 2203/035; H05B 1/02
USPC ......... 219/488, 203, 501, 497, 495, 505, 507, 219/543, 548, 482; 244/134 R, 134 D; 323/369; 363/106, 109
See application file for complete search history.

(56) References Cited

U.S. PATENT DOCUMENTS

| | | | | |
|---|---|---|---|---|
| 4,128,448 | A * | 12/1978 | Bitterice et al. | 156/166 |
| 4,999,545 | A * | 3/1991 | Summer | 315/219 |
| 6,326,764 | B1 * | 12/2001 | Virtudes | 320/101 |
| 2003/0155467 | A1 * | 8/2003 | Petrenko | 244/134 R |
| 2006/0203525 | A1 * | 9/2006 | Yu et al. | 363/97 |

* cited by examiner

*Primary Examiner* — Mark Paschall
(74) *Attorney, Agent, or Firm* — Andrew C. Siminerio

(57) ABSTRACT

An inverter system includes inverting circuitry for inverting an input DC signal into a square wave or quasi-square wave AC signal across a resistance, and a controller for causing the inverting circuitry to invert the input DC signal into the AC signal. The DC signal is a DC voltage having a value that ranges from 24-32 volts DC. The AC signal is an AC voltage having a value that ranges from 115-230 volts AC RMS.

20 Claims, 3 Drawing Sheets

INVERTER SYSTEM

CROSS REFERENCE TO RELATED APPLICATION

This application is a continuation of U.S. patent application Ser. No. 10/972,234, filed Oct. 22, 2004, entitled "Aircraft Windshield Defogging/Deicing System And Method Of Use Thereof", which is incorporated herein by reference.

BACKGROUND OF THE INVENTION

1. Field of the Invention

The present invention relates to an inverter system for supplying an AC voltage to a resistance.

2. Description of Related Art

Today's aircraft windshield defogging/deicing systems generally include a resistive coating deposited on an inner surface of one of a plurality of transparent layers which are laminated and held together via transparent interlayers. Many of the resistive coatings in use today are optimally powered with DC electrical power that is available on the aircraft for powering other systems, such as avionic systems. However, certain resistive films are optimally powered by AC electrical power. Heretofore, this AC electrical power was supplied by an inverter which inverted the DC electrical power into AC electrical power having a sinusoidal waveform.

A drawback of utilizing an inverter to invert DC electrical power into AC electrical power having a sinusoidal waveform is that the inverter must be configured to perform this function. In order to output a sinusoidal AC waveform, however, the inverter needs components, such as filter capacitors and/or filter inductors, which add weight and cost to the inverter.

What is, therefore, needed, and not disclosed in the prior art, is an aircraft windshield defogging/deicing system that overcomes the above drawbacks and others. Still other drawbacks that the present invention overcomes will become apparent to those of ordinary skill in the art upon reading and understanding the following detailed description.

SUMMARY OF THE INVENTION

Disclosed herein is an inverter system that includes inverting circuitry for inverting an input DC signal into a square wave or quasi-square wave AC signal across a resistance, and a controller for causing the inverting circuitry to invert the input DC signal into the AC signal. The DC signal is a DC voltage having a value that ranges from 24-32 volts DC. The AC signal is an AC voltage having a value that ranges from 115-230 volts AC RMS.

The controller can be responsive to the input DC signal for outputting one or more control signals which cause the inverting circuitry to invert the input DC signal into the AC signal.

A switch can selectively connect the inverting circuitry, the controller, or both to a source of the DC signal.

The source of the DC signal can be a DC generator. The DC generator can be driven by an internal combustion engine, such as a jet engine or a reciprocating engine.

The resistance can be resistive coating that is positioned on a transparent sheet. The resistive coating can have a resistivity of no greater than 50 ohms/square, more desirably no greater than 25 ohms/square, and most desirably no greater than 10 ohms/square. The resistive coating can be selected from indium tin oxide and tin oxide. The resistive coating can be a transparent film that has been deposited on at least one of the pair of transparent sheets maintained in facing relation. Each one of the pair of transparent sheets can be selected from glass and polycarbonate, and sheets can be maintained in facing relation by an interlayer, for example polyvinyl butyral.

The DC voltage can be 28 volts DC. The AC voltage can be 115 volts AC RMS.

The AC signal can have at least one of the following properties: a duty cycle ranging from 0%-100% over a 1 second time period; and a frequency ranging from 25-1000 Hertz. Desirably, the AC signal has a duty cycle ranging from 25%-75% over a 1 second time period.

The system can include a temperature sensor to monitor temperature of the resistance, wherein the AC signal can have a duty cycle that varies in response to the monitored temperature.

The inverter desirably weighs no more than 8 lbs., and more desirably weighs no more than 6 lbs.

Also disclosed herein is an inverter system that includes inverter circuitry, and a controller for causing the inverter circuitry to invert DC power into AC power having a square wave or quasi-square wave waveform. The DC power is a DC voltage ranging from 24-32 volts DC. The AC power is an AC voltage ranging from 115-230 volts AC RMS and having a duty cycle ranging from 0%-100% and a frequency ranging from 25-1000 Hertz.

A resistance can be coupled to the AC power. The resistance can be a deicing coating formed on a first transparent sheet. A second transparent sheet can be coupled to the first transparent sheet by a transparent interlayer. The deicing coating can be positioned between the first and second transparent sheets, and in one embodiment between the first transparent sheet and the transparent interlayer. Each of the first and second transparent sheets can be selected from a glass sheet and a polycarbonate sheet, and the transparent interlayer can be polyvinyl butyral.

The AC power can have a duty cycle ranging from 25%-75% over a 1 second time period. The DC voltage can be 28 volts DC. The AC voltage can be 115 volts AC RMS.

A temperature sensor can be provided to monitor temperature of the resistance, wherein the AC power can have a duty cycle that varies in response to the monitored temperature.

A source of the DC power can be a DC generator which is driven by an external source.

The deicing coating can be comprised of indium tin oxide or tin oxide. The deicing coating can have a resistivity of no greater than 50 ohms/square.

DETAILED DESCRIPTION OF THE INVENTION

The present invention will be described with reference to the accompanying figures where like reference numbers correspond to like elements.

In the following description, any numerical range recited is intended to include all sub-ranges subsumed therein. For example, a range of "1 to 10" is intended to include all sub-ranges between and including the recited minimum value of 1 and the recited maximum value of 10, that is having a minimum value equal to or greater than 1 and a maximum value equal to or less than 10. Because the disclosed numerical ranges are continuous, they include every value between the minimum and maximum values. Unless expressly indicated otherwise, the various numerical ranges specified in this application are approximations.

Figure 1:
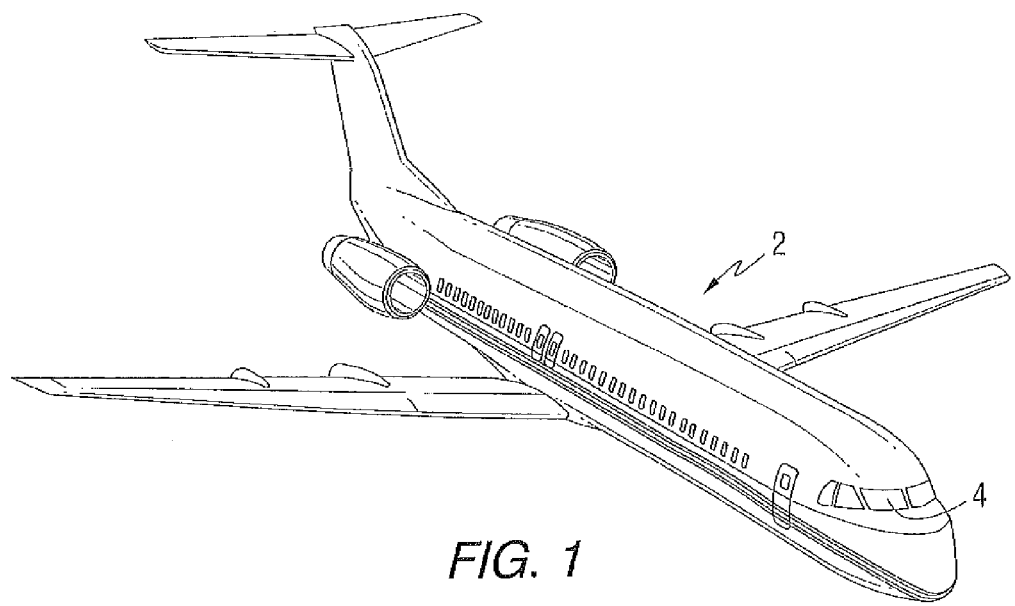
FIG. 1 is a perspective view of an aircraft including windshields that can utilize the windshield defogging/deicing system of the present invention.
Figure 2:
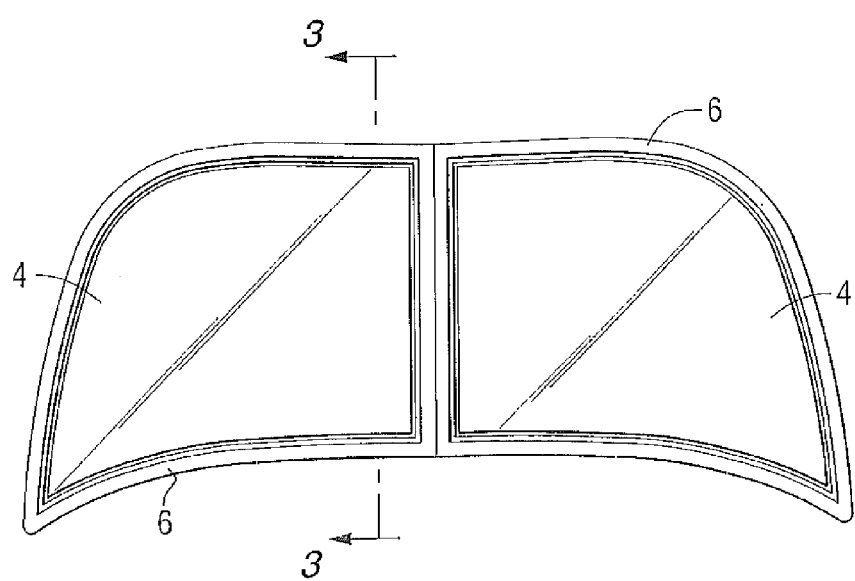
FIG. 2 is an isolated enlarged view of the windshields of FIG. 1.
Figure 3:
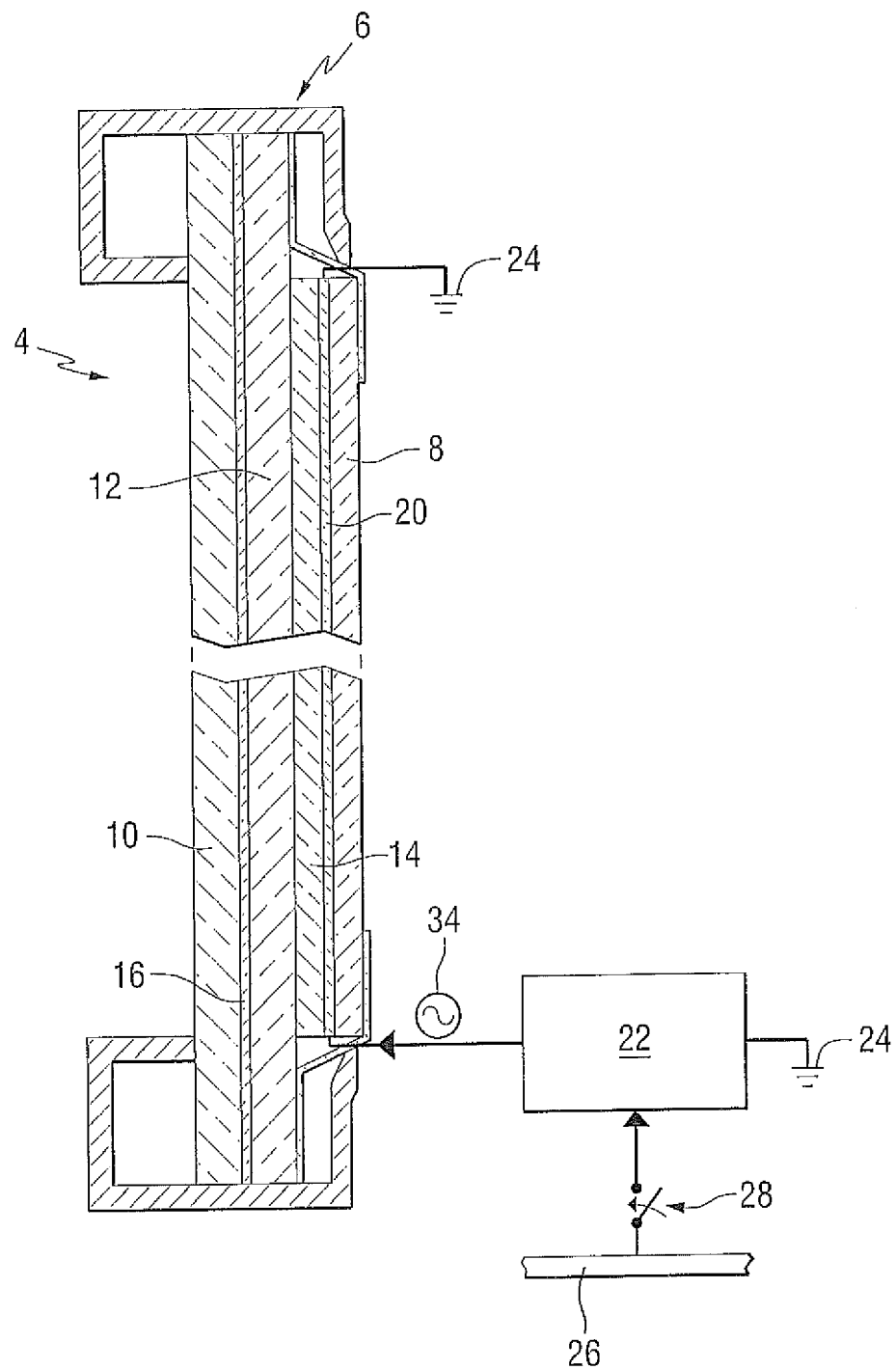
FIG. 3 is a cross-section taken along lines III-III in FIG. 2 showing a resistive coating coupled to an inverter for supplying AC electrical power thereto.

With reference to FIGS. 1-3, an aircraft 2, such as a winged aircraft as shown or a helicopter (not shown), typically includes one or more windshields 4 positioned adjacent the fore or front end thereof.

Each windshield 4 desirably has a form that conforms to the shape of the corresponding aircraft 2 where each windshield 4 is installed. To facilitate attachment to aircraft 2, each windshield 4 includes a support frame 6 that surrounds the windshield and provides a mechanical interface between the windshield 4 and the body of aircraft 2 for connecting windshield 4 to aircraft 2.

A typical windshield 4 includes at least two transparent sheets joined together by a transparent interlayer. In the embodiment of windshield 4 shown in FIG. 3, the transparent sheets include outer glass layer 8, inner glass layer 10, and intermediate glass layer 12. Glass layers 8, 10 and 12 are typically heated and bent to a desired curved configuration. Outer glass layer 8 and intermediate glass layer 12 are joined together by a first transparent interlayer 14. Inner glass layer 10 and intermediate glass layer 12 are joined together by a second transparent interlayer 16. Although not required each interlayer can be polyvinyl butyral. Outer glass layer 8, first interlayer 14, intermediate glass layer 12, second interlayer 16 and inner glass layer 10 are bonded together in a manner well known in the art. Accordingly, a detailed description of how this bonding occurs will not be included herein for simplicity of description.

In use, it is not uncommon for windshield 4 to accumulate moisture or ice on the exposed surface of outer glass layer 8 due to climatic conditions. In order to overcome this accumulation, whereupon the operator of aircraft 2 retains an unimpeded view through windshield 4, a system is provided for the defogging/deicing windshield 4. This system includes a resistive coating 20 coupled to an inverter 22 and a signal ground 24. Inverter 22 is coupled to a source of DC electrical power, such as a DC buss 26, via a switch 28. Switch 28 can be any suitable and/or desirable switch, such as a mechanical switch, a power transistor, and the like.

Figure 4:
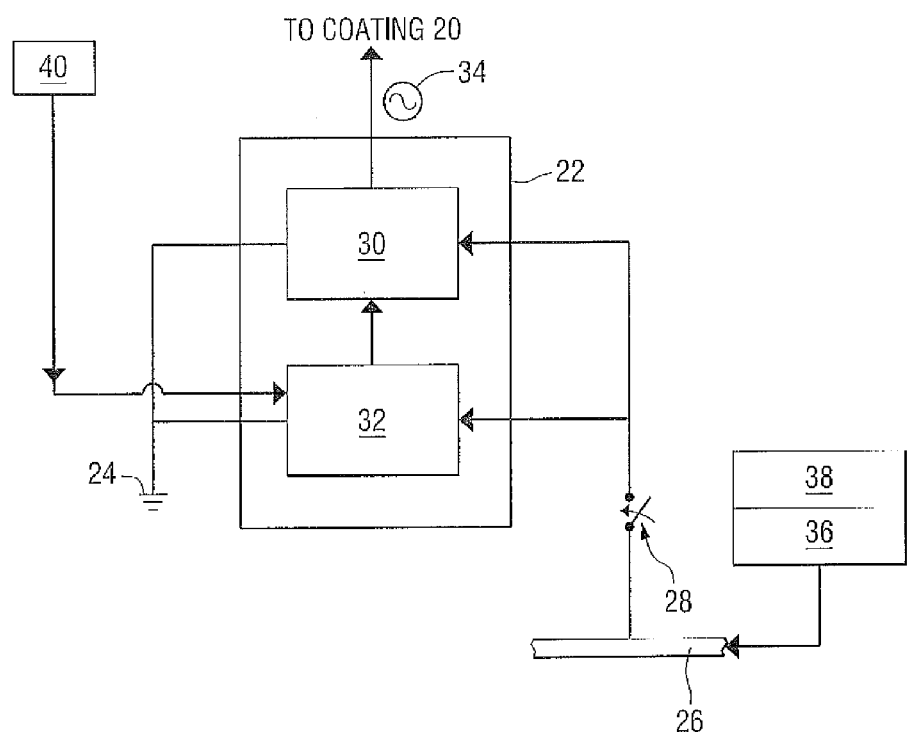
FIG. 4 is an block diagram of the internal components of the inverter shown in FIG. 3 coupled to an aircraft engine driven DC generator via a DC buss.

With reference to FIG. 4 and with continuing reference to FIG. 3, inverter 22 includes a single phase DC-to-AC inverter circuitry 30 coupled to a fixed modulation inverter controller 32. Since conventional inverter circuitry 30 is well known in the art, and since the internal components of inverter circuitry 30 are not relevant to the present invention, details regarding the components of inverter circuitry 30 have not been included herein for simplicity of description.

In operation, in response to closure of switch means 28, inverter controller 32 outputs to inverter circuitry 30 suitable control signals that cause inverter circuitry 30 to invert DC electrical power received from DC buss 26 into single phase AC electrical power which is output to resistive coating 20. In response to being supplied with the AC electrical power output by inverter circuitry 30, resistive coating 20 produces sufficient heat to either avoid the formation of moisture or ice on the outer surface of outer glass layer 8 and/or to reverse the accumulation of moisture or ice on the exposed surface of outer glass layer 8.

In one non-limiting embodiment, resistive coating 20 is a transparent film that has been deposited, e.g., sputtered, on the inner surface of outer glass layer 8. One embodiment of resistive coating 20 is a NESATRON® indium tin oxide (ITO) coating available from PPG Industries, Inc. or a NESA® tin oxide coating also available from PPG Industries, Inc. NESATRON® and NESA® are registered trademarks of PPG Industries, Inc. However, the recital of these particular coatings is not to be construed as limiting the invention since the use of any suitable resistive conductive coating is envisioned.

One desirable embodiment of resistive coating 20 has a resistivity no greater than 50 ohms per square, for example, no greater than 25 ohms per square or no greater than 10 ohms per square. However, this is not to be construed as limiting the invention. In the embodiment shown in FIG. 3, layers 8, 10 and 12 are formed from glass. However, this is not to be construed as limiting the invention since any one or more of these layers can be formed from polycarbonate or other suitable transparent materials.

Figure 5:
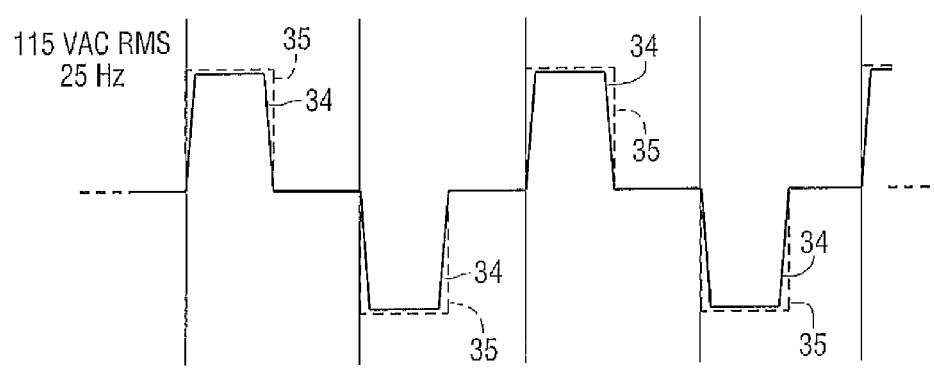
FIG. 5 shows an exemplary waveform output by the inverter of FIG. 3 in operation.

With reference to FIG. 5, and with continuing reference to FIGS. 3 and 4, the AC electrical power output to resistive coating 20 is desirably one of a square wave AC signal 35 or a quasi-square wave AC signal 34. Desirably, this AC signal has a duty cycle between 25% and 75% and/or a frequency between 25 Hertz and 1000 Hertz. However, these ranges of duty cycle and frequency are not to be construed as limiting the invention. In one non-limiting embodiment, inverter circuitry 30 inverts 24-32 volt DC electrical power supplied by DC buss 26 into an AC electrical power having a value of between 115 and 230 VAC RMS. However, this is not to be construed as limiting the invention since the use of other ranges of DC electrical power and/or AC electrical power are envisioned.

With reference back to FIG. 4, the DC electrical power supplied to DC buss 26 can originate from a DC generator 36 which is driven by an aircraft engine 38 in a manner known in the art. Aircraft engine 38 can be an internal combustion engine such as a jet engine or a reciprocating engine. However, this is not to be construed as limiting the invention.

In a method of deicing an aircraft windshield 4, aircraft 2 is provided with windshield 4 having glass defogging/deicing or resistive coating 20 on a surface thereof other than the surface of the windshield that is exposed to the exterior of the aircraft. Inverter circuitry 30, having inverter controller 32 for controlling the operation thereof, is coupled between resistive coating 20 and DC generator 36. At a suitable time, switch means 28 connects DC buss 26 to inverter controller 32 and inverter circuitry 30. In response to switch means 28 forming this connection, inverter controller 32 causes inverter circuitry 30 to invert the DC electrical power provided by DC buss 26 into AC electrical power having either a square wave or a quasi-square wave waveform, a fixed duty cycle, desirably between 25% and 75%, and a fixed frequency, desirably between 25 Hertz and 1000 Hertz. The thus produced AC electrical power is supplied to resistive coating 20 which responds to the supply of AC electrical power by producing heat of sufficient extent to avoid or reduce the accumulation of moisture and/or ice on the exposed surface of outer glass layer 8.

Configuring inverter circuitry 30 to output a fixed frequency square wave or quasi-square wave signal having a fixed modulation duty cycle enables inverter circuitry 30 to be constructed with a minimum number of components, e.g., large filter capacitors and/or inductors, whereupon the weight, size and cost of the inverter 22 can be less than inverters in use today that output sinusoidal waveforms. In one embodiment, configuring inverter circuitry 30 to output the fixed frequency square wave or quasi-square wave signal having a 50% fixed modulation duty cycle enables the overall weight of inverter 22 designed for use with aircraft windshield to be reduced to no more than 8 lbs., desirably, no more than 6 lbs., and, more desirably, no more than 5 lbs.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An inverter system comprising:
   inverting circuitry for inverting an input DC signal into a square wave or quasi-square wave AC signal across a resistance; and
   a controller for causing the inverting circuitry to invert the input DC signal into the AC signal, wherein:
   the DC signal is a DC voltage having a value that ranges from 24-32 volts DC; and
   the AC signal is an AC voltage having a value that ranges from 115-230 volts AC RMS.

2. The system of claim 1, wherein the controller is responsive to the input DC signal for outputting one or more control signals which cause the inverting circuitry to invert the input DC signal into the AC signal.

3. The system of claim 2, further including a switch for selectively connecting the inverting circuitry, the controller, or both to a source of the DC signal.

4. The system of claim 1, wherein the resistance is a resistive coating positioned on a transparent sheet.

5. The system of claim 4, wherein the resistive coating has a resistivity of no greater than 50 ohms/square, more desirably no greater than 25 ohms/square, and most desirably no greater than 10 ohms/square.

6. The system of claim 4, wherein the resistive coating is selected from indium tin oxide and tin oxide.

7. The system of claim 4, wherein the resistive coating is a transparent film that has been deposited on at least one of a pair of transparent sheets maintained is spaced facing relation.

8. The system of claim 4, wherein each one of the pair of transparent sheets is selected from glass and polycarbonate.

9. The system of claim 1, wherein the AC signal has at least one of the following properties:
   a duty cycle ranging from 0%-100% over a 1 second time period; and
   a frequency ranging from 25-1000 Hertz.

10. The system of claim 9, wherein the AC signal has a duty cycle ranging from 25%-75% over a 1 second time period.

11. The system of claim 1, further including a temperature sensor to monitor temperature of the resistance, wherein the AC signal has a duty cycle that varies in response to the monitored temperature.

12. An inverter system comprising:
    inverter circuitry; and
    a controller for causing the inverter circuitry to invert DC power into AC power having a square wave or quasi-square wave waveform, wherein:
    the DC power is a DC voltage ranging from 24-32 volts DC; and
    the AC power is an AC voltage ranging from 115-230 volts AC RMS and having a duty cycle ranging from 0%-100% and a frequency ranging from 25-1000 Hertz.

13. The system of claim 12, including a resistance coupled to the AC power.

14. The system of claim 13, wherein the resistance is a deicing coating formed on a first transparent sheet.

15. The system of claim 14, further including a second transparent sheet coupled to the first transparent sheet, wherein the deicing coating is positioned between the first and second transparent sheets.

16. The system of claim 15, wherein each of the first and second transparent sheets is selected from a glass sheet and a polycarbonate sheet.

17. The system of claim 12, wherein the AC power has a duty cycle ranging from 25%-75% over a 1 second time period.

18. The system of claim 13, further including a temperature sensor to monitor temperature of the resistance, wherein the AC power has a duty cycle that varies in response to the monitored temperature.

19. The system of claim 14, wherein the deicing coating is comprised of indium tin oxide or tin oxide.

20. The system of claim 14, wherein the deicing coating has a resistivity of no greater than 50 ohms/square.

* * * * *